United States Patent
Schwamborn

(10) Patent No.: US 12,250,095 B2
(45) Date of Patent: Mar. 11, 2025

(54) METHOD, SYSTEM, AND GATEWAY FOR LINKING TIME-SENSITIVE FIELDBUSES

(71) Applicant: WAGO Verwaltungsgesellschaft mbH, Minden (DE)

(72) Inventor: Fabian Schwamborn, Loehne (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 383 days.

(21) Appl. No.: 17/748,855

(22) Filed: May 19, 2022

(65) Prior Publication Data

US 2022/0278872 A1 Sep. 1, 2022

Related U.S. Application Data

(63) Continuation of application No. PCT/EP2020/082943, filed on Nov. 20, 2020.

(30) Foreign Application Priority Data

Nov. 20, 2019 (DE) .................... 10 2019 217 909.6

(51) Int. Cl.
*H04L 12/403* (2006.01)
*H04L 7/00* (2006.01)

(52) U.S. Cl.
CPC ........ *H04L 12/4035* (2013.01); *H04L 7/0008* (2013.01)

(58) Field of Classification Search
CPC ................. H04L 12/66; H04L 12/4035; H04L 2012/4026
See application file for complete search history.

(56) References Cited

U.S. PATENT DOCUMENTS

| | | | |
|---|---|---|---|
| 7,668,182 B2 | 2/2010 | Hetzel et al. | |
| 9,756,590 B2 | 9/2017 | Koenigseder et al. | |
| 2003/0035444 A1 | 2/2003 | Zwack | |
| 2014/0355518 A1* | 12/2014 | Brown | H04W 88/16 370/328 |
| 2015/0103832 A1* | 4/2015 | Chandhoke | H04L 49/206 370/392 |

(Continued)

FOREIGN PATENT DOCUMENTS

| | | |
|---|---|---|
| DE | 102004009889 A1 | 9/2004 |
| DE | 102012204586 A1 | 10/2013 |

(Continued)

OTHER PUBLICATIONS

International Search Report dated Mar. 1, 2021 in corresponding application PCT/EP2020/082943.

(Continued)

*Primary Examiner* — Benjamin Lamont
(74) *Attorney, Agent, or Firm* — Muncy, Geissler, Olds & Lowe, P.C.

(57) ABSTRACT

A method and system for networking a first time-sensitive field bus with a second time-sensitive field bus, the first time-sensitive field bus comprising a first subscriber device and having a first dedicated time domain and the second time-sensitive field bus comprising a second subscriber device and having a second dedicated time domain, the first and the second field buses being connected to each other with the aid of a gateway for data transmission.

12 Claims, 4 Drawing Sheets

(56) References Cited

U.S. PATENT DOCUMENTS

| | | | | |
|---|---|---|---|---|
| 2016/0080533 | A1* | 3/2016 | Jeon | H04L 12/66 |
| | | | | 370/402 |
| 2017/0201964 | A1* | 7/2017 | Gupta | H04W 76/40 |
| 2019/0322299 | A1* | 10/2019 | Mong | B61L 15/0072 |
| 2020/0213022 | A1* | 7/2020 | Götz | H04J 3/0697 |
| 2021/0014168 | A1* | 1/2021 | Geng | H04L 45/121 |
| 2021/0091919 | A1* | 3/2021 | Geng | H04L 7/0008 |

FOREIGN PATENT DOCUMENTS

| | | |
|---|---|---|
| DE | 102015212561 A1 | 1/2017 |
| EP | 1283611 A2 | 2/2003 |

OTHER PUBLICATIONS

Brunner, Stefan et al: "Automotive E/E-architecture enhancements by usage of ethernet TSN" 2017 13$^{th}$ Workshop on Intelligent Solutions in Embedded Systems, IEEE, Jun. 12, 2017, pp. 9-13, DOI: 10.1109/WISES.2017.7986925.

Helge Zinner et al: "Application and realization of gateways between conventional automotive and IP/Ethernet-based networks" Design Automation Conference, 2011 48$^{th}$ ACM/EDAC/IEEE, Jun. 5, 2011, pp. 1-6.

Hantel: "TSN Interdomain Communications" IEEE Industrial TSN Profile, Rockwell Automation, 2018.

Use Cases IEC/IEEE 60802, V1.2—Sep. 3, 2018.

* cited by examiner

METHOD, SYSTEM, AND GATEWAY FOR LINKING TIME-SENSITIVE FIELDBUSES

This nonprovisional application is a continuation of International Application No. PCT/EP2020/082943, which was filed on Nov. 20, 2020, and which claims priority to German Patent Application No. 10 2019 217 909.6, which was filed in Germany on Nov. 20, 2019, and which are both herein incorporated by reference.

BACKGROUND OF THE INVENTION

Field of the Invention

The present invention relates to time-sensitive field bus systems, in particular industrial field bus systems for controlling industrial systems. In particular, the invention relates to a method, a system and a gateway for networking at least two time-sensitive field buses.

Description of the Background Art

Field buses are used to interconnect different subscriber devices (e.g., field devices such as sensors, actuators, detectors, control elements, etc., as well as controllers, such as control or automation devices, programmable logic controllers (PLCs), etc.) in a plant (e.g., an industrial manufacturing facility, vehicle, building, etc.) for the purpose of communication. However, the communication does not take place, in particular, exclusively between different field devices and a field bus controller, which controls and monitors the processes running in the plant. A subscriber device may be a field device or a controller and has, in particular, an interface to the field bus.

The messages to be transmitted via a field bus (e.g., data blocks, data streams) are at least partially time-sensitive, i.e., they have real-time requirements with regard to the transmission latency. For example, it is necessary for time-sensitive data of this type that a message sent by a subscriber device is reliably received by the field bus controller or another field device connected to the field bus within a predictable period of time.

The data to be transmitted between subscriber devices of the field bus comprise not only value communication, such as measured values, manipulated variables or instructions, but also event communication for the temporal coordination of machines and plant parts. For example, the coordination and synchronization of movements of machine parts increasingly no longer take place via mechanical apparatuses (e.g., metal presses having mechanically rigid, coupled feeding and ejecting apparatuses in the machine cycle, camshafts, gears, etc.), but rather via digital messages, which are transmitted with real-time requirements via field buses.

A field bus is assigned to a time domain, in which all subscriber devices each have a timer (e.g., a clock). The timers of the subscriber devices are synchronized with each other within the time domain and thus have a common understanding of time. All subscriber devices of a field bus may thus follow a defined field bus communication cycle and are coordinated with each other to carry out the corresponding actions at the right point in time. One subscriber device of the field bus acts as a master for the time domain, the timer of the master supplying the time reference for the other subscriber devices of the time domain. The latter subscriber devices, which derive their time from the master within the time domain, are also referred to as slaves. The role of the time master in the field bus may be taken on by a field bus controller, however also by another subscriber device connected to the field bus. The time master of the field bus may synchronize its time base with another time base, for example with the time master of another field bus or with a hierarchically superordinate time base. In that the masters of multiple field buses synchronize their particular field bus time with each other, a time domain may also comprise multiple field buses. The "clocks" are adjusted by the synchronization of the time base. However, this does not necessarily mean that two field buses within one time domain have the same communication cycles.

A first generation of field buses was developed to replace the cabling complexity due to the parallel wiring of machine parts, which used to be common practice, by means of cable assemblies, with digital transmission technology. Multiple, in part proprietary, field bus protocols were developed for this purpose. Later generations of field buses are based primarily on the Ethernet standard IEEE 802.3, the Ethernet protocols having been modified or expanded to implement time-sensitive networks (TSNs).

Standards for real-time Ethernet protocols are developed, for example, by the IEEE 802.1Q task group, for TSN networks. A time-aware scheduler is defined, for example, by the IEEE802.1QBV standard. The scheduler makes it possible to divide the communication in a network into fixed, periodically repeating communication cycles and to define, reserve or negotiate fixed time slots for transmitting time-critical data within the cycles. A clocked end-to-end transmission between two subscriber devices may be implemented hereby.

Non-time-sensitive data (best effort data) may be transmitted outside the time slots provided for real-time transmission, the known protocols for a packet-switched transmission (e.g., Ethernet protocol) being used for this purpose. Guard bands may be configured by the time-aware scheduler to prevent an overlapping of transmissions of non-time-sensitive data packets with the time slots reserved for real-time transmissions.

In TSN networks, it is furthermore possible to interrupt and subsequently resume the transmission of non-time-sensitive data packets during the real-time intervals. The coexistence of time-sensitive and non-time-sensitive communication is made possible in this way in a TSN-capable network.

During the course of the increasing digital transformation and networking of plants (e.g., of an entire production facility), it is necessary to facilitate the communication between field buses as well as the communication between a field bus and equipment of a higher control level, process control level and/or operating control level and/or company level. The networking relates to both non-time-sensitive data and time-sensitive data.

Although most field buses in use today base real-time protocols on Ethernet, technical differences do exist despite this commonality, so that different field bus types are incompatible or not completely compatible with each other. In addition, different generations of field buses may be used, for example when parts of a plant are added, replaced or modernized, field buses of different generations not necessarily being fully compatible. At present, efforts are being made to specify universally usable real-time protocols, which are expected to replace the many proprietary and incompatible protocols for time-sensitive field buses. However, their use requires existing field bus system to be replaced or retrofitted, which is often not economically justifiable.

Existing approaches for time-sensitive communication between two or multiple field buses assume that all field buses to be coupled have a uniform understanding of time, all time offsets as well as time durations and/or start times of the field bus communication cycles, however, being synchronized. However, field buses are often configured in complex ways at the start of manufacturing, so that the machines controlled by the field bus and/or plant parts are optimally coordinated with each other. An adjustment of the cycle times of an existing field bus to newly added plant parts having further field buses would, however, make it necessary to reconfigure the existing processes controlled by the field bus.

A need therefore exists to interconnect time-sensitive field buses, which are not completely compatible with each other.

SUMMARY OF THE INVENTION

It is therefore an object of the present invention to provide a method for networking a first time-sensitive field bus with a second time-sensitive field bus, a system for networking at least two time-sensitive field buses, as well as a gateway for the purpose of time synchronization and for networking at least two time-sensitive field buses.

To achieve the object, in particular, a gateway is used, which mediates the communication between time-sensitive field buses. Since the gateway supports the particular time domain of all field buses connected thereto, the field buses may communicate with each other largely without adjusting the time and, in particular, the times of the communication cycles. This applies to time-sensitive data as well as to non-time-sensitive data.

An aspect of the present invention relates to a method for networking a first time-sensitive field bus with a second time-sensitive field bus. The first time-sensitive field bus comprises a first subscriber device and has first dedicated time domain. The second time-sensitive field bus comprises a second subscriber device and has a second dedicated time domain. The first and second field buses are connected to each other with the aid of a gateway for the purpose of data transmission. The method comprises the definition of the first time domain in the first field bus by the first subscriber device of the first field bus as well as the definition of the second time domain in the second field bus by the second subscriber device of the second field bus, the transmission of time-sensitive data in defined first time slots within the first field bus, and the transmission of time-sensitive data in defined second time slots within the second field bus. The method furthermore comprises the synchronization of the gateway as a slave with respect to the first time domain of the first field bus and additionally with respect to the second time domain of the second field bus, the gateway supporting at least two time domains simultaneously. Due to the support for the two time domains, the gateway is configured to transmit messages or data, such as data packets, between the field buses in keeping with the communication cycles defined on the field buses and time slots for sensitive data without the particular time domains of the field buses having to be synchronized with respect to the absolute time and the cycle times of the communication cycles having to be adjusted.

The method furthermore comprises the steps of transmitting non-time-sensitive data at a time outside the first time slot from the first field bus to the gateway, the temporary storage of the non-time-sensitive data in the gateway as well as the transmission of the non-time-sensitive data received from the first field bus from the gateway to the second field bus at a time outside the second time slot. In this way, non-time-sensitive data may be transmitted, taking into account the first time slots of the first field bus and the second time slots of the second field bus defined on the particular field buses.

It is possible in practice for there to be a time offset between the first and second time domains. This time offset results due to the different definitions of the time of the first and second time domains as well as from the difference between the starting times of the communication cycles of the first and second field buses. The time domains of the field buses may furthermore have different frequencies. In particular, the clocks of the subscriber devices have specific clock frequencies, which may be frequency-synchronized accordingly within a time domain, although this does not apply between the time domains. Even if the clock frequencies in the time domains of the first and second field buses are nominally the same, the local oscillators for the timers may have slight differences, which result in frequency differences of the timers. In addition, different time durations for the communication cycles may be defined in the first and second time domains, within which the first and second time slots in each case are periodically repeated for transmitting the time-sensitive data. Moreover, time differences may exist between the first and second field buses, e.g., in relation to the first and second time slots for transmitting time-sensitive data.

The gateway includes a first and a second timer, and the method further includes the steps of synchronizing the first timer as a slave with the first time domain of the first field bus and synchronizing the second timer as a slave with the second time domain of the second field bus. As a result, the gateway "knows" the time defined in the first and second time domains in each case and may coordinate, for example, the transmission of non-time-sensitive data in such a way that the time slots for transmitting time-sensitive data are not affected.

The frequency of the first timer of the gateway can be first set exclusively to the frequency of the second time domain of the second timer of the gateway, and the first timer of the gateway is set as the master for the first field bus for the purpose of setting the frequency of the first field bus to the frequency of the second time domain. In this way, a synchronization of the clock frequencies may take place in the time domains of the first and second field buses. Based on a minimal synchronization of this type, the first and second field buses or the first and second time domains may have differently defined times, however the time offset is time-invariant, i.e., constant over time. In particular, due to only one synchronization of the clock frequency of the timers in the first and second field buses, a hard abrupt change in time in the first field bus is avoided, which could occur during the adjustment of the first and second field bus times. The adjustment of the frequencies may take place over the time period which does not impair the operation of the processes controlled in the first field bus.

The gateway can determine the cycle time period of the first time domain and the cycle time period of the second time domain at a particular reference time following the frequency synchronization. The latter reference time point may be determined in relation to the time valid in the first and/or second time domain(s).

The gateway may furthermore determine a time offset between the first time domain and the second time domain at the reference time point. The time offset includes the differences in the definition of the time of the first and second time domains as well the difference between the starting time points of the communication cycles of the first and second field buses. The gateway may additionally communicate the cycle time duration of the first time domain to the second field bus and communicate the cycle time duration of the second time domain to the first field bus. In this way, for example, the first subscriber device in the first time domain or the second subscriber device in the second time domain is able to determine and continue the cycle time duration and the time offset in the particular other field bus in relation to the reference time point.

The first subscriber device can define a first time slot in the first field bus for communicating time-critical data, and the second subscriber device defines a second time slot in the second field bus for communicating time-critical data, the definition taking place in such a way that the time slots of the first field bus and the second field bus overlap in time. The first and second time slots may be identical (i.e., completely overlap), or they have at least one temporal intersection to be able to set up a time-critical communication between the first field bus and the second field bus.

Time-critical data passes through the gateway from the second field bus to the first field bus and/or vie versa during the temporally overlapping first and second time slots. A clocked end-to-end transmission between two subscriber devices and is implemented thereby beyond field bus boundaries.

A further aspect of the invention relates to a system for networking at least two time-sensitive field buses, including a first time-sensitive field bus, which has a first subscriber device and a first dedicated time domain, the first time domain containing first time slots for transmitting time-sensitive data. The system further comprises a second time-sensitive field bus, which has a second subscriber device and a second dedicated time domain, the second time domain containing second time slots for transmitting time-sensitive data. The system furthermore includes at least one gateway, which connects the first and second field buses to each other for the purpose of data transmission, the gateway including a first timer, which is configured to be synchronized as a slave with respect to the first time domain of the first field bus, and the gateway including a second timer, which is configured to be synchronized as a slave with respect to the second time domain of the second field bus. Due to the support for the two time domains, the gateway is configured to transmit messages or data, such as data packets, between the field buses in keeping with the communication cycles defined on the field buses and time slots for sensitive data without the particular time domains of the field buses having to be synchronized with respect to the absolute time and the cycle times of the communication cycles having to be adjusted.

The gateway may include a buffer for buffering non-time-sensitive data of the first field bus transmitted from the field bus at a time outside the first time slots and received by the gateway, and to transmit the buffered data from the gateway to the second field bus outside the second time slots. This makes it possible to transmit non-time-sensitive data at times at which the two field buses are not transmitting time-sensitive data.

The gateway may also be configured to receive information via the first and second time slots of the first and second field buses and to take into account the non-time-critical data during transmission. This prevents the non-time-critical data from being sent during a time slot of the second field bus reserved for time-critical transmission.

The subscriber device of the first field bus may be configured to define the first time slots in such a way, and the subscriber device of the second time slots may be configured to define the second time slots in such a way that the first and second times slots overlap in time. The gateway may furthermore be configured to transfer time-critical data from the second field bus to the first field bus or vice versa during the overlapping first and second time slots of the first and second field buses.

A further aspect relates to a gateway for networking at least two time-sensitive field buses having different time domains. The gateway includes a first timer, which is configured to be synchronized as a slave with respect to the first time domain of the first field bus, and includes a second timer, which is configured to be synchronized as a slave with respect to the second time domain of the second field bus. Due to the support for the two time domains, the gateway is configured to transmit messages or data, such as data packets, between the field buses in keeping with the communication cycles defined on the field buses and time slots for sensitive data without the particular time domains of the field buses having to be synchronized with respect to the absolute time and the cycle times of the communication cycles having to be adjusted.

The gateway can be configured for the data transmission of non-time-critical data between the first field bus and the second field bus at points in time or during time periods outside time slots for time-critical data of the first field bus or the second field bus, the gateway having a buffer for buffering received non-time-critical data of a field bus prior to being sent to the other field bus.

The gateway may also be configured to receive information about time slots of the first field bus and information about time slots of the second field bus and to take this information into account while sending data.

The gateway may moreover be configured to transfer time-critical data from the first field bus to the second field bus or vice versa during overlapping time slots.

The gateway can be configured to take into account the information about the time slot of the field bus and the information about the time slot of the second field bus when transferring time-critical data.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
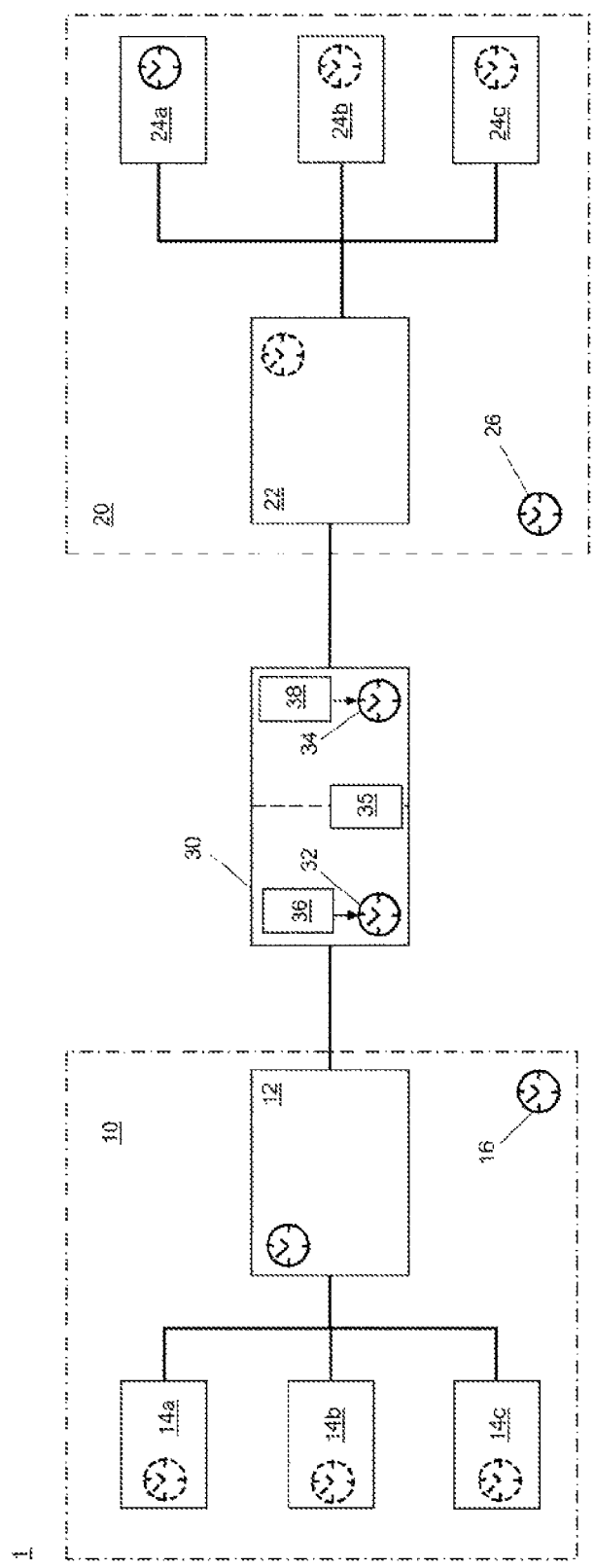
FIG. 1 shows a block diagram of a system including a first time-sensitive field bus and a second time-sensitive field bus.

FIG. 1 shows a block diagram of an exemplary system 1 including a first time-sensitive field bus 10 and a second time-sensitive field bus 20. First field bus 10 and second field bus 20 comprise, for example, subscriber devices 12, 14a-c or 22, 24a-c, subscriber devices 12, 22 each being controllers of the field bus, for example an automation device, a programmable logic controller, PLC, a node or another industrial controller, and subscriber devices 14a-c or 24a-c being field devices, for example I/O modules for sensors and/or actuators, which may measure or influence variables of a process automated by the field bus. Subscriber devices 12, 14a-c or 22, 24a-c are communicatively connected to each other in particular field bus 10, 20 via an interface, the definition of the interface comprising an interface protocol.

Subscriber devices 12, 14a-c of first field bus 10 belong to a first time domain 16, all subscriber devices 12, 14a-c having the same understanding of an absolute time. For this purpose, each subscriber device 12, 14a-c has a timer, which is schematically symbolized in FIG. 1 by the face of a clock. Subscriber devices 22, 24a-c of second field bus 20 correspondingly belong to a second time domain 26. In field buses 10 and 20, the field bus lines emerging from controller 12, 22 are connected to the field buses in a star shape. Field buses may also generally be formed by other topologies, such as a tree topology, bus topology, ring topology. It is also possible that subscriber devices 12, 24a-c or 22, 24a-c of a field bus 10, 20 are at least partially connected to each other by a wireless network.

One subscriber device 12, 24a-c or 22, 24a-c in each case predefines the time for particular field bus 10 or 20 and is therefore referred to as the master. In first field bus 10, controller 12, for example, is the master, which is represented by solid lines in FIG. 1 as a clock face. In second field bus 20, subscriber device 24a, for example, is the field bus master. The clock of a master 12 or 24a predefines the time in the field bus in each case, the remaining subscriber devices of a field bus, i.e., subscriber devices 14a-c in the first field bus or subscriber devices 22, 24b-c, each derive their time from the master. This is done, for example, in that the subscribers within a field bus exchange messages at regular or irregular intervals according to the Precision Time Protocol according to the IEEE 1588 standard and thus obtain and maintain a common understanding of the time in this way.

Within first field bus 10 and second field bus 20, non-time-sensitive as well as time-sensitive data may be transmitted in each case, as is described in greater detail below. For example, the data transmission in both field buses may be divided into transmission cycles according to the IEEE 802.1Q standard, first time slots in first field bus 10 and second time slots in second field bus 20 being defined, in which a clocked end-to-end transmission is possible between two subscriber devices of the same field bus in each case.

System 1 further comprises a gateway 30, via which both field buses 10, 20 are communicatively connected to each other. Although FIG. 1 shows that field buses 10, 20 are connected to each other via their controllers 12 and 22, this is not mandatory. Instead, gateway 30 has an interface to each of field buses 10 and 20, so that it represents a subscriber device with respect to particular field bus 10, 20. Gateway 30 supports at least two time domains 32 and 34. Further time domains may be supported according to the number of field buses to be coupled. In particular, the gateway comprises timers 36 and 38, which may be configured for first time domain 16 or for second time domain 26.

Gateway 30 may interconnect first field bus 10 and second field bus 20 for the purpose of data transmission. For this purpose, gateway 30 maintains a memory 35 for buffering or temporarily storing data. For example, non-time-sensitive data may be stored in memory 35. However, gateway 30 may also transfer a clocked end-to-end transmission between first and second field buses 10, 20 during defined time slots without a delay.

Figure 2:
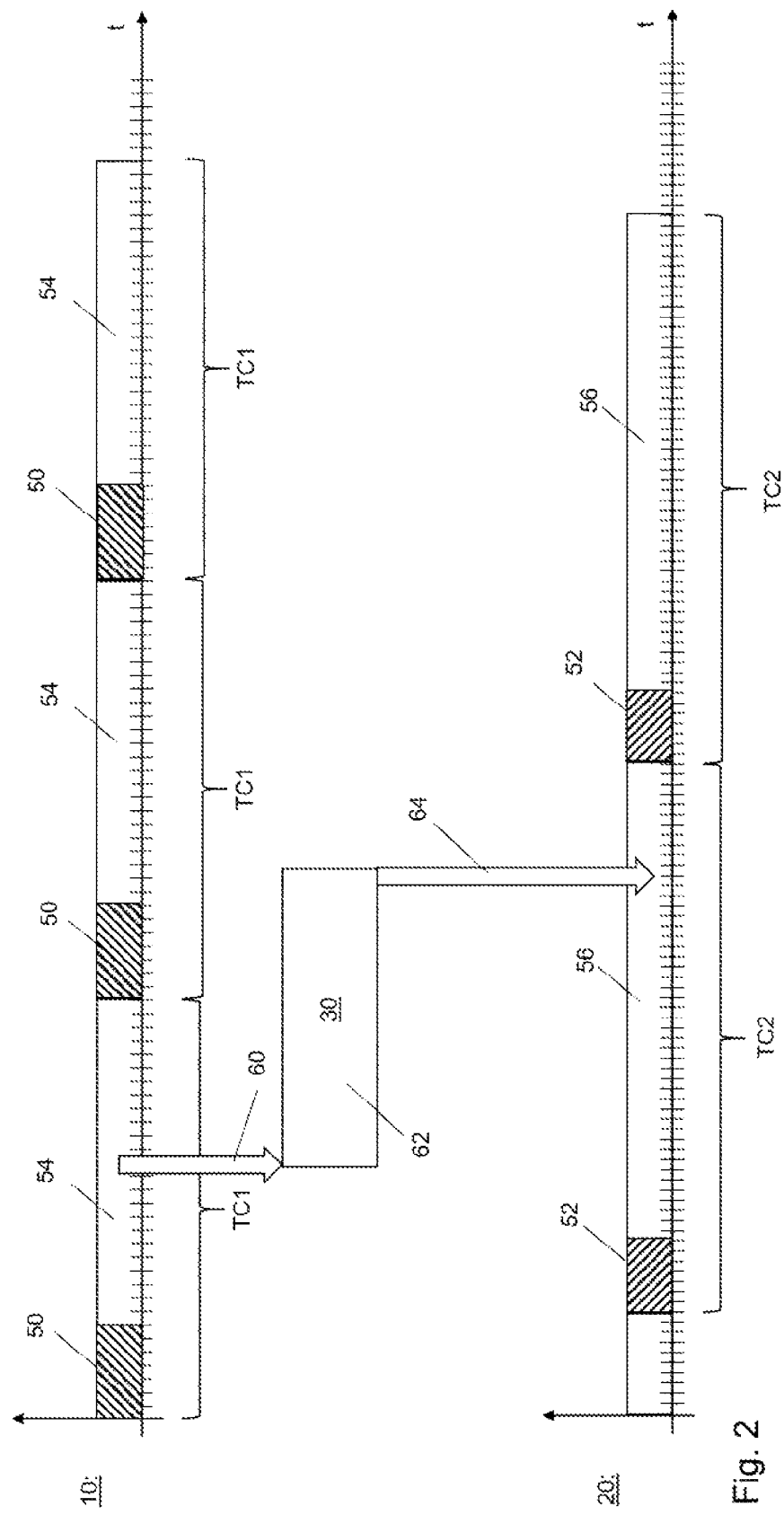
FIG. 2 schematically shows a timing diagram of a first and second field bus as well as the transmission of non-time-sensitive data through the gateway.

FIG. 2 shows an example of a timing diagram of first field bus 10 and second field bus 20. First field bus 10 has communication or transmission cycles with periodically recurring cycle intervals TC1, which are defined by location and duration according to the upper timeline in FIG. 2. Second field bus 20 correspondingly has communication cycles with periodically recurring cycle intervals TC2, which are defined by location and duration according to the lower timeline in FIG. 2.

In field buses 10, 20, first time slots 50 or second time slots 52 may be defined, negotiated or ascertained for transmitting time-sensitive data within particular field bus 10, 20. For example, the time-aware scheduler defined in the IEEE 802.1QBv standard may be used for this purpose. First time slots 50 and second time slots 52 coincide with the start of corresponding communication cycles only by way of example. Time slots 50, 52 may generally be situated at any position within a transmission cycle for time-sensitive transmission. It is also possible to define multiple separate time slots 50, 52 per transmission cycle for a time-sensitive communication.

FIG. 2 also shows time periods 54 and 56, which belong to the particular transmission cycles, which are situated outside time slots 50 or 52 reserved for transmitting time-sensitive data. At these intervals 54, 56, non-time-sensitive data may be transmitted between field buses 10, 20, for example according to the Ethernet protocol, to which the CSMA/CD (carrier-sense multiple access with collision detection) access method applies.

In an example, timers 36 and 38 of gateway 30 are first synchronized as slaves with respect to time domains 16, 26 of field buses 10 and 20. Since gateway 30 has an interface as a subscriber device to first field bus 10 as well as second field bus 20, corresponding cycle time durations TC1 and TC2, the temporal location of the communication cycles as well as time slots 50 and 52, in which time-sensitive communication is handled in particular field buses 10, 20, are known on the part of gateway 30.

Correspondingly, intervals 54 and 56 which transmit non-time-sensitive data are also known.

A transmission of non-time-sensitive data between first field bus 10 and second field bus 20 may take place in that non-time-sensitive data 60 are transmitted from first field bus 10 to gateway 30 during a first non-time-sensitive interval 54, as symbolized by arrow 60. These data 60 may be buffered in buffer 35 of gateway 30, as symbolized by step 62. Finally, the buffered data may be transmitted from gateway 30 to second field bus 20 during intervals 56 outside second time slots 52, as symbolized by arrow 64. For example, to send data 64 to the second field bus with the aid of the CSMA/CD method or another contention method, gateway 30 must ensure that second field bus 20 is free for transmission during time slots 56.

Figure 3:
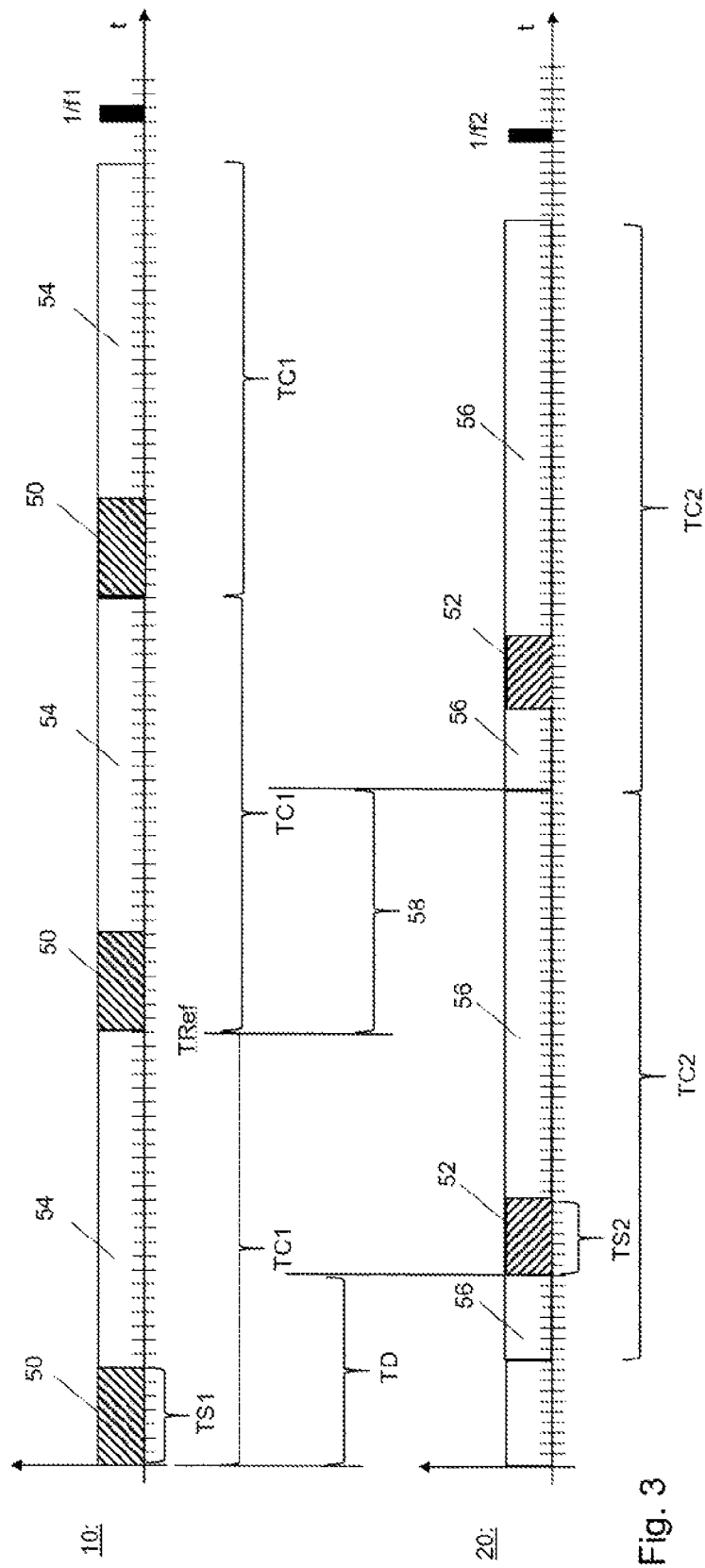
FIG. 3 schematically shows a detailed timing diagram of the cycle times defined for the first and second field buses.

FIG. 3 schematically shows a detailed timing diagram of the cycle times defined for first and second field buses 10, 20 according to some aspects of the invention. In one example, the timers in the subscriber devices of field buses 10 and 20 may have different clock frequencies f1 or f2. In FIG. 3, the reciprocal value of clock frequencies 1/f1 or 1/f2, namely the clock cycle duration, is illustrated in each case by a black bar. Even if both clock frequencies f1 and f2 nominally have the same frequencies (i.e., according to a specification), the clocks of time domains 16 and 26 of the two field buses run at different speeds, if the actual values of clock frequencies f1 and f2 differ slightly from each other.

Moreover, a time offset 58 may occur between the starting time points of the communication cycles. A time offset 58 of this type results, on the one hand, due to the different definitions of the time in the two field buses 10, 20, and, on the other hand, from the difference between the starting time points of the communication cycles of first field bus 10 and second field bus 20, even if both field buses were to have the same understanding of time. The communication cycles may also have different durations TC1 and TC2. Time offset 58 may therefore generally be defined only with respect to an (absolute) reference time point TRef. Absolute reference time point TRef may be expressed accordingly in the time of first field bus 10 as well as in the time of second field bus 20. If time durations TC1 and TC2 are in a rational relationship to each other, a particular time offset 58 recurs after a predictable number of cycles of the first or second field bus. For example, if cycle time duration TC1 in the first field bus is 50 ms, and cycle time duration TC2 in the second field bus is 25 ms, for example, time offset 58 may be zero in the second field bus after a first cycle, 25 ms with respect to the first field bus in the second field bus, and then zero again, etc. However, if time offset 58 is known at a point in time TRef, it is possible to determine time offset 58 in advance for all communication cycles of the first and second field buses, even if cycle time durations TC1 and TC2 are not in a rational relationship to each other.

Moreover, different durations TS1 and TS2 of first and second time slots 50 and 52 may occur on field buses 10 and 20 for the time-sensitive communication, since they may be specified independently of each other for both field buses 10 and 20. In addition, first and second time slots 50 and 52 may have time differences TD in terms of their start times. These, in turn, may generally be predictably determined only with respect to an absolute reference time point TRef, since start times of time slots 50 and 52 may vary for the time-sensitive communication with the cycle times in the individual field buses.

According to an example, as described above, first timer 36 of gateway 30 is configured as a slave of first field bus 10, and second timer 38 of gateway 30 is configured as a slave of second field bus 20. To simplify the communication between first and second field buses 10, 20, it may now be useful to synchronize only frequencies f1 and e2 of first time domain 16 and second time domain 26. Due to such a synchronization of the timer clock frequencies, the time offset between the time of the two time domains 16 and 26 remains stable, whereby the determination of points in time in gateway 30 or in subscriber devices 12, 14a-c or 22, 24a-c of the first and second field buses is simplified with respect to the other time domain 16, 26 in each case. The timers of both time domains 16, 26 have the same nominal frequency. A frequency synchronization may take place only in that first timer 36 of gateway 30 is determined as the master for first field bus 10, so that gateway 30 is able to make a determination by setting the time in the first field bus. Furthermore, a synchronization of frequency f1 of first timer 36 of gateway 30 may be made to frequency f2 of second time domain 26. A synchronization exclusively of frequencies f1 and f2 in time domains 16, 26, it may be sensible to avoid abrupt changes in time of the subscriber devices in first field bus 10. The frequency may be synchronized during the operation of first field bus 10 via an adjustment time duration, which is selected to be long enough for the processes of first field bus 10 to run without disturbances.

After the frequencies have been synchronized, gateway 30 may determine cycle time durations TC1 and TC2 of first and second time domains 16, 26 at a reference time point TRef. Gateway 30 may furthermore determine time offset 58 between first and second time domains 16, 26 at a reference time point TRef. Gateway 30 may additionally communicate cycle time period TC1 of first time domain 16 to second field bus 20 and communicate cycle time period TC2 of second time domain 26 to first field bus 10. This may take place with respect to reference time point TRef. In this way, certain subscriber devices of first or second field bus 10, 20 may predictably determine the communication cycles of the other field bus 20, 10 in each case.

Figure 4:
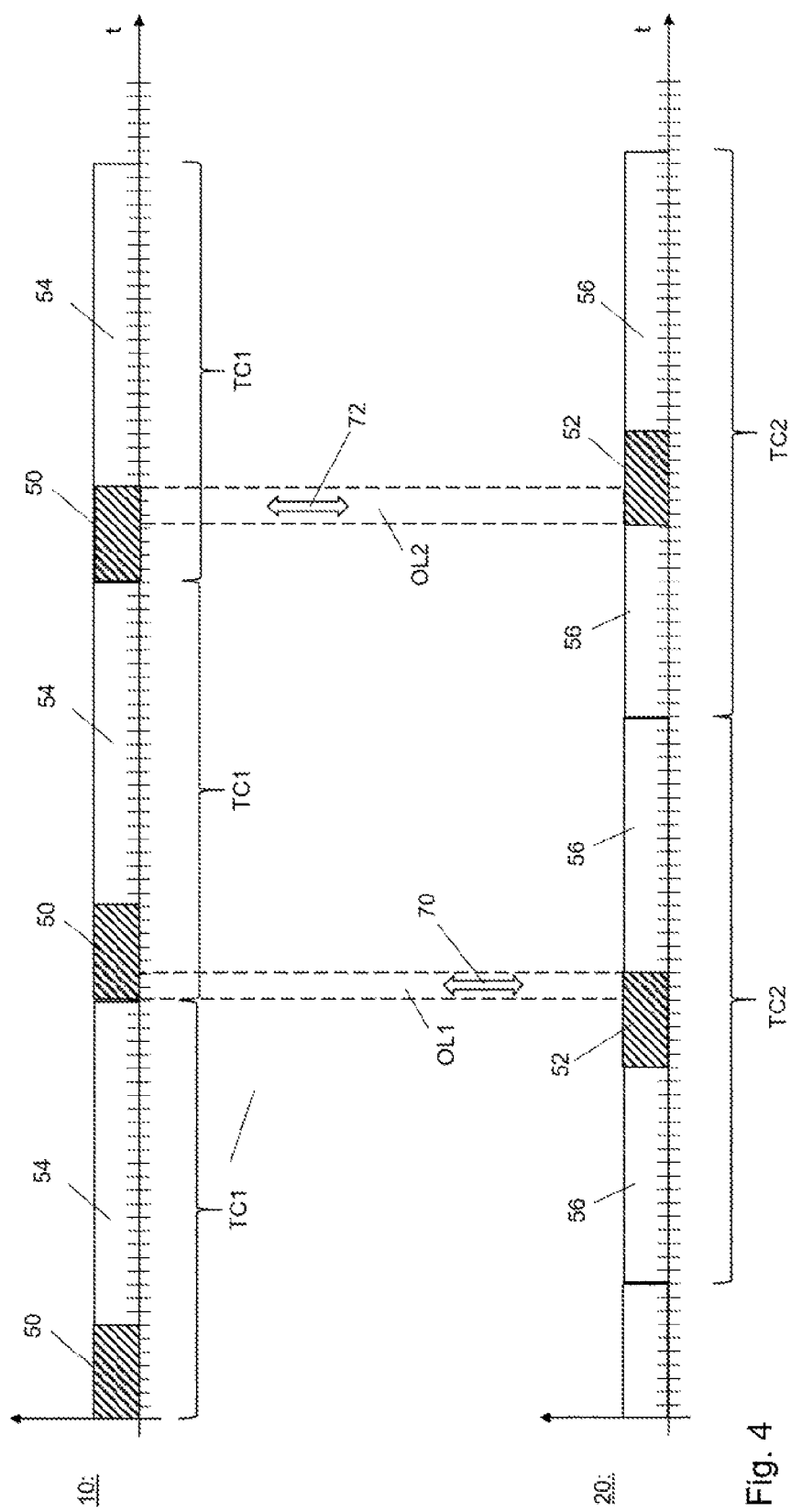
FIG. 4 schematically shows a timing diagram of a first and second field bus as well as the transmission of time-sensitive data through the gateway.

FIG. 4 schematically shows a timing diagram of a first field bus 10 and a second field bus 20 during a transmission of time-sensitive data. Since cycle time durations TC1 and TC2 of first and second time domains 16, 26 are known in both field buses at a reference time point TRef, subscriber device 14c of first field bus 10, for example, may transmit time-sensitive data to subscriber device 24b of second field bus 20. This may take place in that subscriber devices 14c and 24b define time slot 50, 52 in particular field bus 10, 20 for the communication of time-critical data, which at least partially overlap. For example, subscriber devices 14c and 24b may exchange possible time intervals for a time-sensitive communication within the scope of negotiations if they are configured to do so (e.g., as schedulers according to the IEEE802.1QBv standard). For example, subscriber device 14c may send a request to subscriber device 24b to query possible time intervals and then determine a common time interval. It is also possible that subscriber device 14c and/or subscriber device 24b has/have the determination of first or second time slot 50, 52 for the communication of time-critical data representatively carried out by another subscriber device of first or second field bus 10, 20 configured for this purpose.

In the present example according to FIG. 4, corresponding subscriber devices of the first and second field buses have specified common overlapping areas OL1 and OL2 in time slots 50 and 52 and have exchanged this information via gateway 30, so that it is also known to gateway 30. It is also possible that corresponding time slots 50 and 52 are shifted relative to the cycle interval of the particular first or second field bus in the particular cycles for the time-sensitive communication, so that an overlapping area OL1 or OL2 may be generated in each cycle.

It is not necessary to generate an overlapping area OL1, OL2 for the time-sensitive communication in each cycle TC1 or TC2 of first or second field bus 10, 20. For example, it may be sufficient to define an overlapping area during each second, third, etc. cycle of first or second field bus 10, 20.

If first and second time slots 50 and 52 are known during the communication cycles of first and second field buses 10, 20, which are reserved for a time-sensitive communication within the field buses, overlapping areas OL1 and OL2 may be determined or calculated in a rule-based manner for a time-sensitive communication between the field buses. It is then sufficient to determine a single pair of overlapping time slots 50 and 52 at a reference time point TRef.

If cycle time durations TC1 and TC2 have a rational relationship to each other, recurring overlapping areas OL1 and OL2 result on a regular basis. In this case, the negotiation and/or determination of time slots 50 and 52 is/are made easier, so that in these cases an overlapping area OL1, OL2 recurs regularly and therefore does not have to be negotiated or determined individually. The gateway 30 is further configured to transmit time-critical data 70, 72 during the temporally overlapping time slots, e.g., OL1 and OL2. In an example, this takes place in that gateway 30 ascertains the time slots for time-sensitive transmission 50 and 52 ascertained between first and second field buses 10, 20 and, in particular, particular overlapping areas OL1, OL2 and conducts the signals between the first and second field buses during these intervals.

Due to the described method, system 1 and gateway 30, it is possible to network time-sensitive field buses 10, 20 without having to carry out an adjustment of the field bus times as well as the communication cycles of the field buses. In particular, existing and, in part incompatible, field buses may be configured thereby to exchange non-time-sensitive data s well as to exchange time-sensitive data.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for networking a first time-sensitive field bus with a second time-sensitive field bus, the first time-sensitive field bus comprising a first subscriber device and a first dedicated time domain, and the second time-sensitive field bus comprising a second subscriber device and a second dedicated time domain, the first and the second field buses being connected to each other via a gateway for data transmission, the method comprising:
    defining the first time domain in the first field bus via the first subscriber device of the first field bus;
    defining the second domain in the second field bus via the second subscriber device of the second field bus;
    transmitting time-sensitive data in defined first time slots within a cycle duration of the first field bus;
    transmitting time-sensitive data in defined second time slots within the second field bus; and
    synchronizing the gateway as a slave with respect to the first time domain of the first field bus and additionally with respect to the second time domain of the second field bus, the gateway supporting at least two time domains simultaneously.

2. The method according to claim 1, further comprising:
    transmitting non-time-sensitive data at the gateway at a time outside the first time slots of the first field bus;
    buffering the non-time-sensitive data in the gateway; and
    transmitting the non-time-sensitive data received from the first field bus from the gateway to the second field bus at a time outside the second time slots.

3. The method according to claim 1, wherein the following is provided between the first time domain and the second time domain:
    a time offset;
    different frequencies;
    different cycle time durations;
    different durations of the first and second time slots; and/or
    time differences between the first and second time slots.

4. The method according to claim 1, wherein the gateway comprises a first timer and a second timer, and wherein the method further comprises:
    synchronizing the first timer as a slave with the first time domain of the first field bus; and
    synchronizing the second timer as a slave with the second time domain of the second field bus.

5. The method according to claim 4, wherein the method further comprises:
    initially synchronizing only the frequency of the first timer of the gateway to a frequency of the second time domain of the second timer of the gateway; and
    setting the first timer of the gateway as the master for the first field bus to set a frequency of the first field bus to the frequency of the second time domain.

6. The method according to claim 5, wherein the method further comprises:
    determining a cycle time duration of the first time domain and a cycle time duration of the second time domain via the gateway at a reference time point;
    determining a time offset between the first time domain and the second time domain via the gateway at the reference time point;
    communicating the cycle time duration of the first time domain to the second field bus;
    communicating the cycle time duration of the second time domain to the first field bus; and
    communicating the time offset to the first and second field buses with respect to the reference time point.

7. The method according to claim 6, wherein the method further comprises:
    defining the first time slots in the first field bus for communicating the time-sensitive data via the first subscriber device of the first field bus; and
    defining the second time slots in the second field bus for communicating the time-sensitive data via the second subscriber device of the second field bus,
    wherein the definitions take place such that the first time slots of the first field bus and the second time slots of the second field bus overlap in time.

8. The method according to claim 7, wherein the method further comprises:
    transferring the time-sensitive data from the second field bus to the first field bus or vice versa during the overlap in time of the first and second time slots.

9. A system for networking at least two time-sensitive field buses, the system comprising:
    a first time-sensitive field bus, including a first subscriber device and a first dedicated time domain, the first time domain containing first time slots within a cycle duration for transmitting time-sensitive data;
    a second time-sensitive field bus, including a second subscriber device and a second dedicated time domain, the second time domain containing second time slots for transmitting time-sensitive data; and
    at least one gateway, which interconnects the first and second field buses for data transmission, wherein the gateway comprises a first timer, which is configured to be synchronized as a slave with respect to the first time domain of the first field bus, and wherein the gateway includes a second timer, which is configured to be synchronized as a slave with respect to the second time domain of the second field bus, such that the gateway supports at least two time domains simultaneously.

10. The system according to claim 9, wherein the gateway comprises a buffer for buffering non-time-sensitive data of the first field bus, that was transmitted from the first field bus at a time outside the first time slots and received by the gateway, and to transmit the non-time-sensitive data from the gateway to the second field bus outside the second time slots.

11. The system according to claim 10, wherein the gateway is configured to receive information about the first and second time slots of the first and second field buses and to take the information into account during the transmission of the non-time-sensitive data.

12. The system according to claim 9, wherein the subscriber device of the first field bus is configured to define the first time slots, wherein the subscriber device of the second field bus is configured to define the second time slots such that the first and second time slots overlap in time, and wherein the gateway is configured to conduct the time-sensitive data from the second field bus to the first field bus or vice versa during the overlapping first and second time slots of the first and second field buses.

* * * * *